(12) United States Patent
Kia et al.

(10) Patent No.: US 10,985,366 B2
(45) Date of Patent: Apr. 20, 2021

(54) HIGH-PERFORMANCE ELECTROACTIVE MATERIAL WITHIN A SANDWICHED STRUCTURE

(71) Applicant: GM Global Technology Operations LLC, Detroit, MI (US)

(72) Inventors: Hamid G. Kia, Bloomfield Hills, MI (US); Xiaosong Huang, Novi, MI (US); Zhongyi Liu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 16/249,443

(22) Filed: Jan. 16, 2019

(65) Prior Publication Data

US 2020/0227735 A1    Jul. 16, 2020

(51) Int. Cl.
*H01M 4/36* (2006.01)
*H01M 4/04* (2006.01)
*H01M 10/0525* (2010.01)
*H01M 4/48* (2010.01)
*H01M 4/62* (2006.01)
*H01M 4/38* (2006.01)

(52) U.S. Cl.
CPC ......... *H01M 4/366* (2013.01); *H01M 4/0404* (2013.01); *H01M 4/386* (2013.01); *H01M 4/483* (2013.01); *H01M 4/628* (2013.01); *H01M 10/0525* (2013.01)

(58) Field of Classification Search
None
See application file for complete search history.

(56) References Cited

U.S. PATENT DOCUMENTS

2011/0111303 A1* 5/2011 Kung ................. H01B 1/18
429/231.8
2016/0006020 A1* 1/2016 Tamaki ................. H01M 4/366
429/231.4

FOREIGN PATENT DOCUMENTS

CN            106784755 A    *  5/2017

OTHER PUBLICATIONS

Machine translation of Tang et al. CN 106784755 A (Year: 2017).*

* cited by examiner

*Primary Examiner* — Wojciech Haske
(74) *Attorney, Agent, or Firm* — Quinn IP Law

(57) ABSTRACT

Systems, methods, and high performance electrochemical devices employing electroactive particles having a sandwich structure are described. The electroactive particle includes an electroactive layer between a pair of dimension-control layers. The electroactive layer includes an electroactive material configured to receive cations and experience a volumetric change in response thereto. The dimension-control layers are configured to inhibit planar dimensional changes of the electroactive particle such that the volumetric change of the electroactive layer occurs through a vertical dimension of the electroactive particle. The vertical dimension is orthogonal to the planar dimensions.

15 Claims, 3 Drawing Sheets

HIGH-PERFORMANCE ELECTROACTIVE MATERIAL WITHIN A SANDWICHED STRUCTURE

INTRODUCTION

The present disclosure relates to high-performance electroactive materials for lithium-ion electrochemical devices, and more particularly to electroactive materials within a sandwiched structure for optimizing electrode performance in lithium-ion electrochemical devices.

High-energy density electrochemical cells, such as lithium-ion batteries may be used in a variety of consumer products, such as mobile devices including laptops, tablets, and cellular telephones, and vehicles, such as Hybrid Electric Vehicles ("HEVs") and Electric Vehicles ("EVs"), and the like.

High-performance electrodes for electrochemical cells suffer from significant drawbacks. For example, electrodes with silicon-containing electroactive materials experience a large amount of Coulombic fade during charge-discharge cycles. In particular, lithiation and de-lithiation of the silicon-containing electroactive material results in large volume changes during charge-discharge cycles which may limit performance and/or lifetime of the battery.

SUMMARY

While not being bound by theory, diminished performance and/or lifetime of the battery resulting from during charge-discharge cycles is believed to be due, at least in part, to cracking and reformation of the solid electrolyte interphase on the electroactive particle during the volume changes during charge-discharge cycles. Beneficially, the electroactive particles as described herein employ a sandwich structure that provides anisotropic volumetric changes of the electroactive particles during lithiation and de-lithiation of the electroactive material.

According to aspects of the present disclosure, an electroactive particle includes an electroactive layer, a first dimension-control layer disposed on a first face of the electroactive layer, and a second dimension-control layer disposed on a second face of the electroactive layer. The electroactive layer includes an electroactive material. The electroactive material is configured to intercalate lithium cations or form alloys with lithium such that the electroactive material experiences a volumetric change in response to the lithiation. The second face is opposite the first face. The first dimension-control layer and the second dimension-control layer are configured to inhibit changes in a planar dimension of the electroactive particle and allow changes in a vertical dimension of the electroactive particle such that the volumetric expansion is experienced in the vertical dimension and inhibited in the planar dimension. The vertical dimension is orthogonal to the planar dimension.

According to further aspects of the present disclosure, the electroactive material is at least one of atomic silicon, silicon oxides, or silicon alloys.

According to further aspects of the present disclosure, at least one of the first dimension-control layer and the second dimension-control layer are formed from graphene.

According to further aspects of the present disclosure, the at least one of the first dimension-control layer and the second dimension-control layer are formed from three adjacent sheets of graphene.

According to further aspects of the present disclosure, the at least one of the first dimension-control layer and the second dimension-control layer are formed from a single sheet of graphene.

According to further aspects of the present disclosure, the first dimension-control layer includes a first predetermined number of adjacent sheets of graphene and the second dimension-control layer includes a second predetermined number of adjacent sheets of graphene.

According to further aspects of the present disclosure, an area of exposed surfaces of the dimension-control layers is at least 2 times greater than an area of exposed surfaces of the electroactive layer.

According to aspects of the present disclosure, a method of forming an electroactive particle includes obtaining a substrate, depositing a first dimension-control layer on the substrate, forming an electroactive layer on the first dimension-control layer, and depositing a second dimension-control layer on the electroactive layer to thereby form the electroactive particle such that the first dimension-control layer and the second dimension-control layer are configured to inhibit changes in a planar dimension of the electroactive particle and allow changes in a vertical dimension of the electroactive particle such that volumetric expansion of the electroactive layer is experienced in the vertical dimension and inhibited in the planar dimension, the vertical dimension being orthogonal to the planar dimension. The electroactive layer includes an electroactive material therethrough.

According to further aspects of the present disclosure, the first dimension-control layer and the second dimension-control layer are formed from graphene.

According to further aspects of the present disclosure, the electroactive material is at least one of atomic silicon, silicon oxides, or silicon alloys.

According to further aspects of the present disclosure, at least one of the first dimension-control layer and the second dimension-control layer are formed from graphene.

According to further aspects of the present disclosure, the at least one of the first dimension-control layer and the second dimension-control layer are formed from three adjacent sheets of graphene.

According to further aspects of the present disclosure, the at least one of the first dimension-control layer and the second dimension-control layer are formed from a single sheet of graphene.

According to further aspects of the present disclosure, the first dimension-control layer includes a first predetermined number of adjacent sheets of graphene and the second dimension-control layer includes a second predetermined number of adjacent sheets of graphene.

According to further aspects of the present disclosure, an area of exposed surfaces of the dimension-control layers is at least 2 times greater than an area of exposed surfaces of the electroactive layer.

According to further aspects of the present disclosure, an area of exposed surfaces of the dimension-control layers is at least 25 times greater than an area of exposed surfaces of the electroactive layer.

According to further aspects of the present disclosure, the method further includes forming an electrode by mixing the electroactive particle with a binder, and the substrate is a current collector of the electrode.

According to aspects of the present disclosure an electrode includes a current collector, a plurality of electroactive particles, and a binder disposed on the current collector, the binder including the plurality of electroactive particles therein. Each electroactive particle includes an electroactive layer, a first dimension-control layer disposed on a first face of the electroactive layer, and a second dimension-control layer disposed on a second face of the electroactive layer. The electroactive layer includes an electroactive material. The electroactive material is configured to intercalate cations or form alloys with lithium such that the electroactive material experiences a volumetric change in response to the lithiation. The second face is opposite the first face. The first dimension-control layer and the second dimension-control layer are configured to inhibit changes in a planar dimension of the electroactive particle and allow changes in a vertical dimension of the electroactive particle such that the volumetric expansion is experienced in the vertical dimension and inhibited in the planar dimension. The vertical dimension is orthogonal to the planar dimension.

According to further aspects of the present disclosure, the electroactive material is at least one of atomic silicon, silicon oxides, or silicon alloys.

According to further aspects of the present disclosure, at least one of the first dimension-control layer and the second dimension-control layer are formed from graphene.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
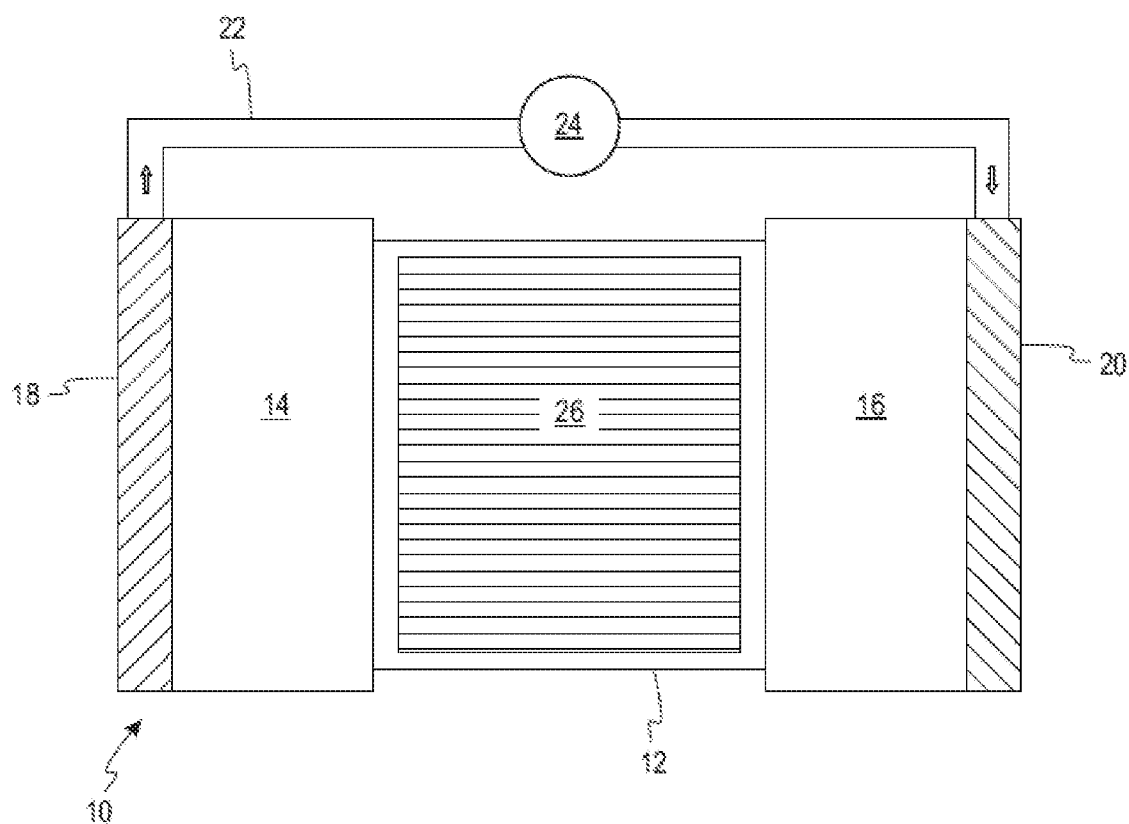
FIG. 1 illustrates a schematic view of an exemplary electrochemical battery cell including an electroactive material with a sandwich structure, according to aspects of the present disclosure.

The present disclosure pertains to electrochemical cells, and more particularly to high-performance lithium-ion electrochemical cells (e.g., lithium-ion batteries) having optimized electroactive materials.

Certain electroactive materials used to form the electrode, such as silicon, may provide a high specific capacity, but undergo large volume changes during charge-discharge cycles. For example, silicon-containing electroactive materials are believed to expand volume by 300% or more during standard charge-discharge cycles. While not being bound by theory, it is believed that reduced performance of battery cells using these electrodes (e.g., Coulombic fade) occurs due the large volume changes during the charge-discharge cycle. Moreover, each charge-discharge cycle undergone by these electrodes generally reduces the Coulombic charge capacity of the electrode. While not being bound by theory, it is believed that breakdown and subsequent reformation of the solid electrolyte interphase during the expansion and contraction of the electroactive material during charge-discharge cycles contributes to the Coulombic fade and may result in limited operable lifetime by drying the electrolyte and cracking the electrode assembly.

Surprisingly, use of electroactive particles employing a sandwiched structure as described herein optimizes electrode performance and useful lifetime. While not being bound by theory, it is believed that incorporation of the electroactive material within a sandwich structure in accordance with the present disclosure inhibits electrolyte dryout and excessive formation of the solid electrolyte interphase by providing for anisotropic volumetric change of the electroactive particles during lithiation and de-lithiation. Beneficially, the anisotropic volumetric change of the electroactive particles with the sandwich structure described herein inhibits fracturing of the solid electrolyte interphase in at least one direction to thereby prolong useful life of the electrolyte by inhibiting cracking and subsequent growth of a majority or substantially all of the solid electrolyte interphase. For example, the sandwich structure described herein may inhibit expansion of the electroactive particle along a planar dimension, such as both the length and the width of the particle, while allowing for expansion through a thickness of the electroactive particle. The length and the width of the electroactive particle may be much greater than the thickness of the electroactive particle such that a majority or a substantially all of the solid electrolyte interphase is disposed on surfaces of the electroactive particle along the length and width of the electroactive particle while a relatively smaller amount of the solid electrolyte interphase is disposed on surfaces of the electroactive particle along the thickness of the particle. Because electroactive particles in accordance with the present disclosure provide for anisotropic volumetric change that is constrained to a minor, vertical dimension, only a small amount of the solid electrolyte interphase will be fractured and reformed, thus optimizing longevity of systems and devices incorporating the electroactive particles.

Referring now to FIG. 1, a battery cell 10 is shown according to aspects of the present disclosure. The battery cell 10 includes a separator 12 disposed between a first electrode 14 and a second electrode 16. The separator 12 allows ionic transfer and inhibits electronic transfer therethrough.

The first electrode 14 is configured to receive or intercalate cations while the battery cell 10 is charging and reject or de-intercalate ions while the battery cell 10 is discharging. As will be explained further below with respect to FIG. 2, the first electrode 14 includes an electroactive particle 202, an electrically conductive filler 204, and a binder 206.

The first electrode 14 is disposed on a first current collector 18. The first current collector 18 is configured to collect and move free electrons between the first electrode 14 and the second electrode 16 via an external circuit 22. The external circuit 22 may include an external device 24 which may be a load that consumes electric power from the battery cell 10 and/or a power source that provides electric power to the battery cell 10.

The second electrode 16 is configured to intercalate the cations received from the first electrode 14 when the battery cell 10 is discharging and de-intercalate the cations for transport to the first electrode 14 while the battery cell 10 is charging. The second electrode 16 includes a second electroactive material (not illustrated) and is disposed on a second current collector 20. The second electroactive material is formed from materials cooperative with the electroactive particle 202 to facilitate ion flow and electron flow between the first electrode 14 and the second electrode 16.

The second current collector 20 is configured to collect and move free electrons between the first electrode 14 and the second electrode 16 via the external circuit 22.

Each of the first electrode 14, the second electrode 16, and the separator 12 may further include an electrolyte 26. The electrolyte 26 is configured to promote movement of ions between the first electrode 14 and the second electrode 16 during charging and discharging of the lithium-ion cell 10. The electrolyte 26 may be liquid, gel, or solid electrolyte.

Figure 2:
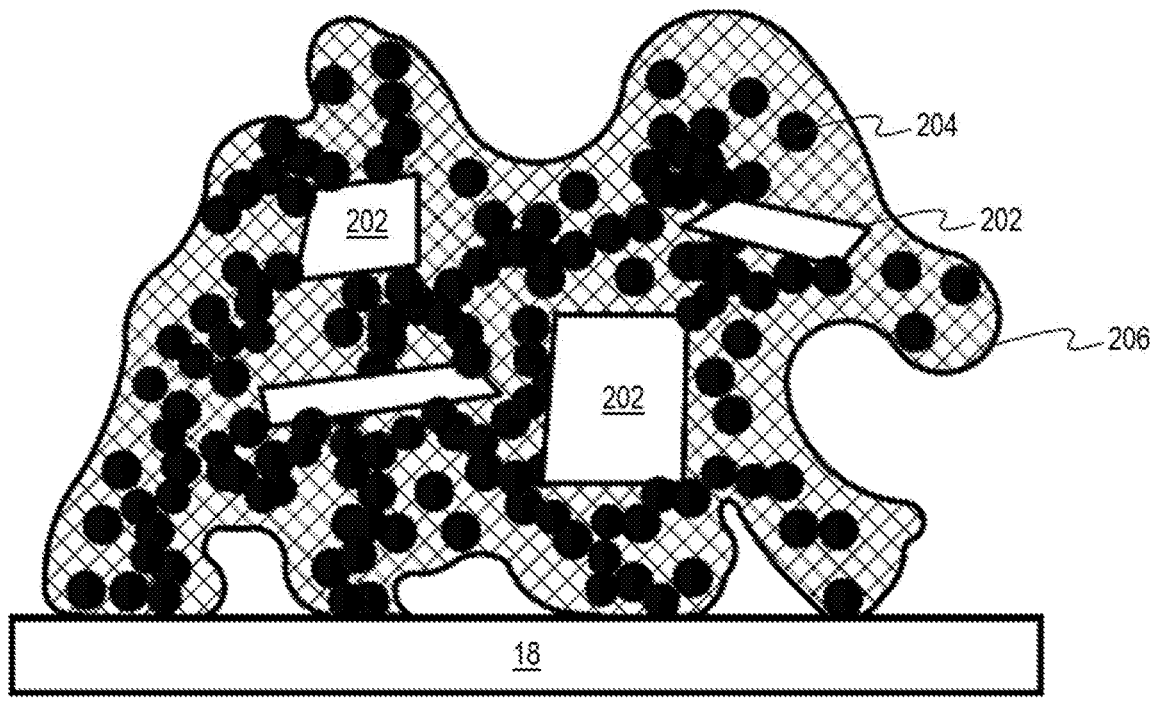
FIG. 2 illustrates a schematic view of an electrode of FIG. 1.

FIG. 2 is a schematic view of the first electrode 14 including electroactive particles 202, the electrically conductive filler 204, and the binder 206 disposed on the first current collector 18. The binder 206 suspends the electroactive particles 202 and the electrically conductive filler 204. As will be explained further below with reference to FIG. 3, the electroactive particles 202 are configured to receive and intercalate the cations during charging of the battery cell 10.

The electrically conductive filler 204 is configured to carry charge between the electroactive particle 202 and the first current collector 18. The electrically conductive filler 204 is dispersed within the first electrode 14 in a concentration at or above the percolation threshold. The electrically conductive filler 204 may be any suitable material such as a carbon-containing material. In some aspects, the electrically conductive filler 204 is selected from the group of carbon black, carbon fiber, graphite, combinations thereof, and the like.

The binder 206 is configured to provide structural support to the electrically conductive filler 204 and the electroactive particles 202. The binder 206 may be, for example, polyacrylic acid, (PAA), aramids, polyvinylidene fluoride (PVDF), ethylene propylene diene monomer (EPDM) rubber, carboxymethoxyl cellulose (CMC), polyacrylonitrile, polyimides, alginate, styrene butadiene rubber (SBR) combinations thereof, and the like.

Figure 3:
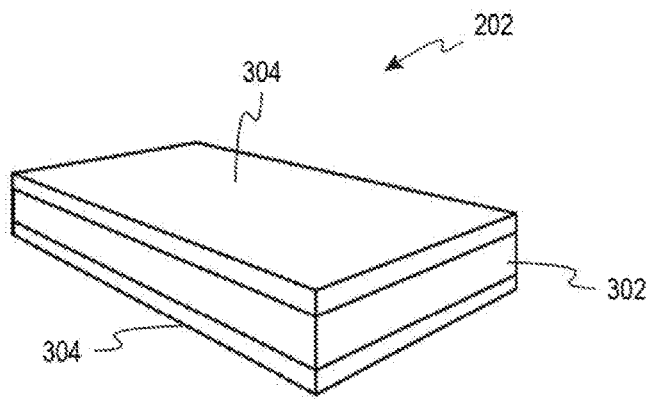
FIG. 3 illustrates a schematic view of the electroactive particle of FIG. 2.
Figure 4A:
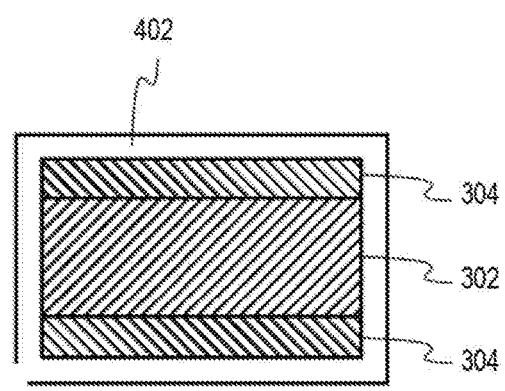
FIGS. 4A-C illustrate a schematic view of the electroactive particle during a discharge-charge cycle.
Figure 4B:
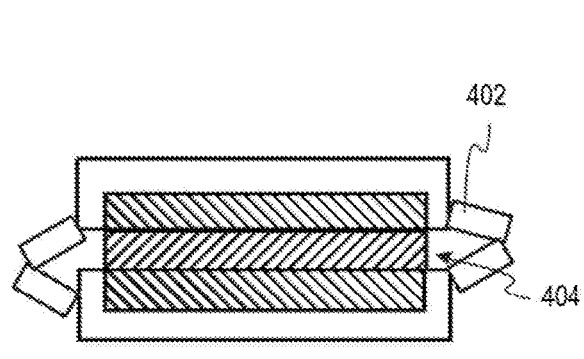
Figure 4C:
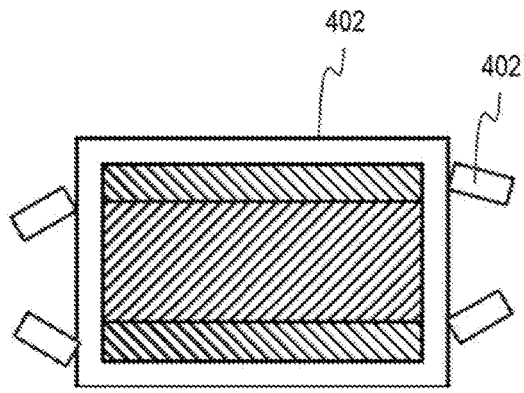

FIG. 3 is a schematic perspective view of the electroactive particle 202 having the sandwich structure. The electroactive particle 202 defines a prismatic shape including an electroactive layer 302 disposed between an adjacent pair of dimension-control layers 304.

The electroactive layer 302 includes the electroactive material configured to receive or intercalate cations, such as lithium ions, while the battery cell 10 is charging and de-intercalate ions while the battery cell 10 is discharging. As used herein, "electroactive material" is a material which experiences volume changes sufficient of at least 20% during charge-discharge cycles that are within design parameters of the battery cell 10. In some aspects, the electroactive material is a silicon-containing compound such as atomic silicon, silicon oxides (e.g., $SiO_x$), silicon alloys, combinations thereof, and the like. Beneficially, silicon-containing electroactive materials provide among the highest theoretical charge capacities for lithium-ion batteries, particularly in comparison to graphite. In some aspects, the electroactive layer includes nanoplatelets of the electroactive material. In some further aspects, the electroactive layer 302 is formed entirely from nanoplatelets.

Each dimension-control layer 304 is configured to inhibit or prevent planar dimensional changes of the electroactive particle 202. For example, the dimension-control layer 304 may be a sheet that is rigid and/or generally resistant to changes in the planar dimensions. The dimension-control layers 304 are attached to the electroactive layer 302 to thereby inhibit or prevent changes of the electroactive particle 202 in the planar dimensions of the prism during charging and discharging of the electroactive layer 302.

Further, the dimensioning layers 304 are also configured to be permeable to the cations through the thickness of the dimensioning layer 304 (e.g., in a vertical dimension that is orthogonal to the planar dimensions). Beneficially, permeability of the dimensioning layer 304 provides for charging and discharging of the electroactive material 302 bulk regardless of the planar dimensions of the electroactive particle 202.

In some aspects, the first dimension-control layer 304 has a first thickness and the second dimension-control layer 304 has a second, different thickness. Beneficially, the different thicknesses may be used to balance structural support and permeability even when the dimension-control layers 304 are formed from a common material. For example, the first thickness may be used to provide an amount of structural support while the second thickness may be used to provide a desired cation permeability.

In some aspects, one or more of the dimension-control layers 304 is graphene. Surprisingly, graphene may be used to optimize mass transfer of cations through the dimension-control layers 304 such that exposed area of the dimension-control layers 304 may increase relative to exposed area of the electroactive layer 302 while providing desired electrical output properties of the electroactive particles 202. While not being bound by theory, it is believed that the mechanism for cation permeation, including lithium cations, through graphene sheets is via defects in the hexagonal lattice. Beneficially, dimension-control layers 304 formed from graphene may employ lower-cost forming processes to provide a relatively high number of resulting defects in the formed graphene sheet.

In some aspects, one or more of the dimension-control layers 304 are doped to promote cation permeability. The doping may occur during or after formation of the respective dimension-control layer 304. In some aspects, the dopant is configured to increase vacancies within the lattice of the respective dimension-control layer 304. Beneficially, the dopant promotes substantially uniform distribution of defects in the formed graphene sheet. In some aspects, boron, nitrogen, phosphorus, sulfur, combinations thereof, and the like are used to dope one or both dimension-control layers 304.

Referring now to FIGS. 3A-C, a schematic cross-sectional representation of the electroactive particles 202 through a discharge-charge cycle is shown. FIG. 3A illustrates the electroactive particle 202 in a charged state. The electroactive particle 202 includes the solid electrode interphase 402 surrounding the electroactive particle 202. Upon discharging, the de-lithiation of the electroactive material reduces the volume of the electroactive layer 302. Because the dimension-control layers 304 inhibit planar dimensional changes of the electroactive particle 202, the volumetric reduction is constrained to the vertical direction.

FIG. 3B illustrates the electroactive particle 202 in a discharged state after an initial formation of the solid electrode interphase 402. As can be seen, the reduction in size of the electroactive material during discharging fractures the solid electrode interphase 402 along the periphery of the electroactive layer 302, which results in an exposed surface 404 of the electroactive particle 202. The remaining portions of the electroactive particle 202 corresponding to the dimension-control layers 304 remain coated in the solid electrode interphase 402. As used herein, "exposed surface" indicates surfaces that are subject to formation of the solid electrolyte interphase 402 thereon during use of the battery cell 10.

FIG. 3C illustrates the electroactive particle 202 in a subsequent charged state. As can be seen, the solid electrode interphase 402 has reformed through reduction on the exposed surface 404 of the electroactive particle 202 while the solid electrode interphase 402 corresponding to the dimension-control layers 304 has not fractured, reformed, or grown.

Beneficially, limiting reduction of the electrolyte 26 to only the periphery of the electroactive layer 302 while still allowing volumetric changes of the electroactive particle 202 inhibits electrolyte 26 consumption and dryout. For example, electroactive particles 202 formed as described herein have a thickness of between about 100 nm and about 300 nm with lateral dimensions of between about 1 µm and about 5 µm. That is, in some aspects, the solid electrode interphase 402 corresponding to the dimension-control layers 304 is at least about 2 times greater than the exposed surface 404. In some aspects, the solid electrode interphase 402 corresponding to the dimension-control layers 304 is at least about 25 times greater than the exposed surface 404.

Figure 5:
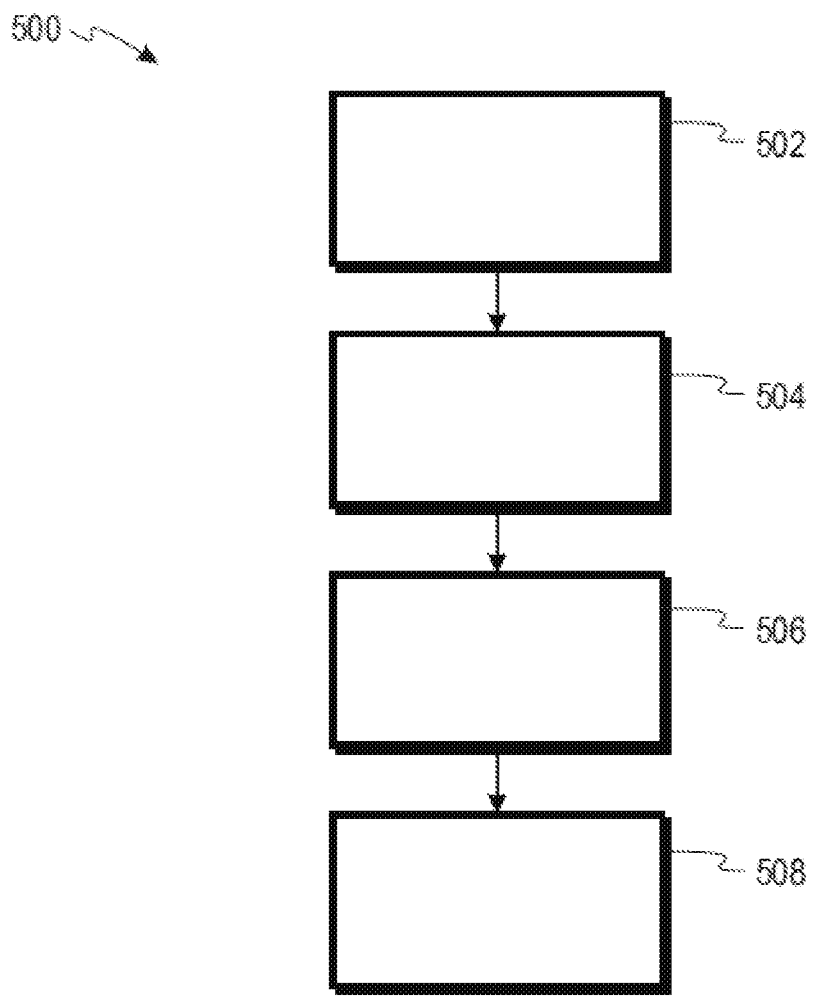
FIG. 5 illustrates a method of forming the electroactive particle, according to aspects of the present disclosure.

FIG. 5 illustrates a method 500 of forming an electroactive particle 202. The method includes obtaining 502 a substrate, depositing 504 a first dimension-control layer 304 on the substrate, forming 506 an electroactive layer 302 on the first dimension-control layer 304, and depositing 508 a second dimension-control layer 304 on the electroactive layer 302 to thereby form at least one electroactive particle 202.

The substrate is configured to orient components of the dimension-control layer 304 for subsequent processing. The substrate may be formed from, for example, copper, nickel, tin, silicon, steel, aluminum, plastic films, combinations thereof, and the like. Beneficially, in some aspects, the electroactive particles 202 are formed in situ such that the substrate is incorporated into the battery cell 10 as the current collector 18 or a portion thereof.

In some aspects, the substrate promotes epitaxial growth of the dimension-control layer 304. For example, a sheet of graphene may be deposited on the substrate via chemical vapor deposition, such as plasma-enhanced chemical vapor deposition, of precursor materials. The precursor materials include a hydrocarbon source, such as methane. The precursor materials may further include a catalyst or co-catalyst, such as diatomic hydrogen. The precursor materials may also include dopants configured to modify the sheet of graphene to provide a desired physical or chemical property to the dimension-control layer 304. In some aspects, the dopants are applied to the first dimension-control layer 304 after formation thereof. In some aspects, the dopants are applied to the first dimension-control layer 304 after formation of the electroactive particle 202.

The first dimension-control layer 304 may be formed from a desired number of graphene sheets. For example, the first dimension-control layer 304 may consist of one graphene sheet, two graphene sheets, or three graphene sheets. Beneficially, one graphene sheet may be used to promote permeability of the cations through the dimension-control layer 304. Beneficially, two graphene sheets may be used balance inhibition of torsion of the electroactive particle 202 and cation permeability. Beneficially, three graphene sheets may be used to further inhibit torsion of the electroactive particle 202. In some aspects, the dimension-control layer 304 is between about 1 nm and about 500 nm to thereby prevent torsion of the electroactive particle.

The electroactive layer 302 is formed directly on the first dimension-control layer 304 such that the interaction between the electroactive layer 302 and the first dimension-control layer 304 inhibits dimensional changes of the electroactive layer 302 in the planar dimension. In some aspects, the electroactive layer 302 is formed via physical vapor deposition, such as electron-beam physical vapor deposition, of the electroactive material. For example, the electroactive layer 302 may be formed by electron-beam physical vapor deposition of silicon to form a film of silicon nanoplatelets. In some aspects, the electroactive layer 302 is formed in a thickness of between about 100 nm and about 300 nm.

The second dimension-control layer 304 may be deposited onto the electroactive layer 302 in a manner similar to depositing 504 the first dimension-control layer 304 onto the substrate. The second dimension-control layer 304 may be formed from a desired number of graphene sheets. For example, the second dimension-control layer 304 may consist of one graphene sheet, two graphene sheets, or three graphene sheets. Beneficially, one graphene sheet may be used to promote permeability of the cations through the dimension-control layer 304. Beneficially, two graphene sheets may be used balance inhibition of torsion of the electroactive particle 202 and cation permeability. Beneficially, three graphene sheets may be used to further inhibit torsion of the electroactive particle 202.

In some aspects, the first dimension-control layer 304 and the second dimension-control layer 304 may be configured to act in concert. In some aspects, either the first dimension-control layer 304 or the second dimension-control layer 304 includes more than three graphene sheets, while the other dimension-control layer 304 includes three or fewer graphene sheets.

After depositing 508 the second dimension-control layer 304, the electroactive particles 202 may be combined with a polymer binder 206 to thereby form the electrode 14. In some aspects, the formed sheet has planar dimensions in the order of millimeters or centimeters. The formed sheet is then processed via, for example, milling to form the electroactive particles 202, which have planar dimensions between about 1 micron and about 5 microns.

While the above-described embodiments include an electrically conductive filler 204, the present disclosure is not so limited. In some aspects, the electroactive particles 202 and are sized, shaped, and loaded within the binder 206 such that no electrically conductive filler 204 is used. In some aspects, the electroactive particles 202 remain at least partially attached to the current collector 18.

While the best modes for carrying out the disclosure have been described in detail, those familiar with the art to which this disclosure relates will recognize various alternative designs and embodiments for practicing the disclosure within the scope of the appended claims.

What is claimed is:

1. An electroactive particle comprising:
an electroactive layer including a first face, a second face opposite the first face, and an electroactive material therebetween, the electroactive material being configured to receive cations such that the electroactive material experiences a volumetric change in response to acceptance of the cations;
a first dimension-control layer disposed on the first face of the electroactive layer and having a first thickness such that the first dimension-control layer inhibits torsion of the electroactive layer; and
a second dimension-control layer disposed on the second face of the electroactive layer and having a second thickness that is less than the first thickness such that the second dimension-control layer promotes permeability of cations therethrough, the second face being opposite the first face, the first dimension-control layer and the second dimension-control layer being configured to act in concert to inhibit changes in a planar dimension of the electroactive particle and allow changes in a vertical dimension of the electroactive particle such that the volumetric change is experienced in the vertical dimension and inhibited in the planar dimension, the vertical dimension being orthogonal to the planar dimension;

wherein the first dimension-control layer and the second dimension-control layer are formed from graphene; and wherein the first dimension-control layer includes a first predetermined number of adjacent sheets of graphene and the second dimension-control layer includes a second predetermined number of adjacent sheets of graphene.

2. The electroactive particle of claim 1, wherein the electroactive material is at least one of atomic silicon, silicon oxides, or silicon alloys.

3. The electroactive particle of claim 1, wherein the first dimension-control layer is formed from at least three adjacent sheets of graphene.

4. The electroactive particle of claim 3, wherein the second dimension-control layer is formed from a single sheet of graphene.

5. The electroactive particle of claim 1, wherein an area of exposed surfaces of the first dimension-control layer and the second dimension-control layer is at least 2 times greater than an area of exposed surfaces of the electroactive layer.

6. A method of forming an electroactive particle, the method comprising:
 obtaining a substrate;
 depositing a first dimension-control layer having a first thickness on the substrate;
 forming an electroactive layer on the first dimension-control layer, the electroactive layer including an electroactive material therethrough;
 wherein the electroactive layer includes a first face, a second face opposite the first face, and the electroactive material therebetween;
 wherein the electroactive layer is configured to receive cations such that the electroactive material experiences a volumetric change in response to acceptance of the cations;
 wherein first dimension-control layer is disposed on the first face and inhibits torsion of the electroactive layer; and
 depositing a second dimension-control layer having a second thickness that is less than the first thickness on the second face of the electroactive layer to thereby form the electroactive particle;
 wherein the second dimension-control layer having the second thickness promotes permeability of cations therethrough;
 wherein the first dimension-control layer and the second dimension-control layer are configured to act in concert to inhibit changes in a planar dimension of the electroactive particle and allow changes in a vertical dimension of the electroactive particle such that volumetric change of the electroactive layer is experienced in the vertical dimension and inhibited in the planar dimension, the vertical dimension being orthogonal to the planar dimension;
 wherein the first dimension-control layer and the second dimension-control layer are formed from graphene; and
 wherein the first dimension-control layer includes a first predetermined number of adjacent sheets of graphene and the second dimension-control layer includes a second predetermined number of adjacent sheets of graphene.

7. The method of claim 6, wherein the electroactive material is at least one of atomic silicon, silicon oxides, or silicon alloys.

8. The method of claim 6, wherein the first dimension-control layer is formed from at least three adjacent sheets of graphene.

9. The method of claim 8, wherein the at least one of the first dimension-control layer and the second dimension-control layer are doped with a dopant selected from the group consisting of boron, nitrogen, phosphorus, sulfur, and combinations thereof to promote uniform distribution of defects in the at least one of the first dimension-control layer and the second dimension-control layer.

10. The method of claim 8, wherein the second dimension-control layer is formed from a single sheet of graphene.

11. The method of claim 8, wherein an area of exposed surfaces of the first dimension-control layer and the second dimension-control layer is at least 2 times greater than an area of exposed surfaces of the electroactive layer.

12. The method of claim 8, wherein an area of exposed surfaces of the first dimension-control layer and the second dimension-control layer is at least 25 times greater than an area of exposed surfaces of the electroactive layer.

13. The method of claim 6, further comprising forming an electrode by mixing the electroactive particle with a binder.

14. An electrode comprising:
 a current collector;
 a plurality of electroactive particles, each electroactive particle including:
  an electroactive layer including a first face, a second face opposite the first face, and an electroactive material therebetween, the electroactive material being configured to receive cations such that the electroactive material experiences a volumetric change in response to acceptance of the cations,
  a first dimension-control layer disposed on the first face of the electroactive layer and having a first thickness such that the first dimension-control layer inhibits torsion of the electroactive layer, and
  a second dimension-control layer disposed on the second face of the electroactive layer and having a second thickness that is less than the first thickness such that the second dimension-control layer promotes permeability of cations therethrough, the second face being opposite the first face, the first dimension-control layer and the second dimension-control layer being configured to act in concert to inhibit changes in a planar dimension of the electroactive particle and allow changes in a vertical dimension of the electroactive particle such that the volumetric change is experienced in the vertical dimension and inhibited in the planar dimension, the vertical dimension being orthogonal to the planar dimension;
  wherein the first dimension-control layer and the second dimension-control layer are formed from graphene; and
  wherein the first dimension-control layer includes a first predetermined number of adjacent sheets of graphene and the second dimension-control layer includes a second predetermined number of adjacent sheets of graphene; and
 a binder disposed on the current collector, the binder including the plurality of electroactive particles therein.

15. The electrode of claim 14, wherein the electroactive material is at least one of atomic silicon, silicon oxides, or silicon alloys.

\* \* \* \* \*